United States Patent
Lohmann et al.

(10) Patent No.: US 9,523,410 B2
(45) Date of Patent: Dec. 20, 2016

(54) PLANETARY GEAR MECHANISM WITH ADJUSTABLE RING GEAR

(71) Applicant: Robert Bosch GmbH, Stuttgart (DE)

(72) Inventors: Christian Lohmann, Witten (DE); Dirk Strasser, Breckerfeld (DE); Dirk Knipschild, Dortmund (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/575,564

(22) Filed: Dec. 18, 2014

(65) Prior Publication Data

US 2015/0176679 A1  Jun. 25, 2015

(30) Foreign Application Priority Data

Dec. 20, 2013 (DE) .................... 10 2013 226 992
Feb. 12, 2014 (DE) .................... 10 2014 202 494

(51) Int. Cl.
| | |
|---|---|
| *F16H 1/28* | (2006.01) |
| *F16H 57/02* | (2012.01) |
| *F16H 1/46* | (2006.01) |

(52) U.S. Cl.
CPC ............ *F16H 1/2818* (2013.01); *F16H 57/02* (2013.01); *F05B 2260/40311* (2013.01); *F16H 1/46* (2013.01); *F16H 2057/02021* (2013.01)

(58) Field of Classification Search
None
See application file for complete search history.

(56) References Cited

U.S. PATENT DOCUMENTS

| | | | | |
|---|---|---|---|---|
| 4,384,498 A | * | 5/1983 | Eichinger | F16H 1/2809 475/343 |
| 4,503,719 A | * | 3/1985 | Hamano | F02N 15/046 475/347 |
| 4,590,811 A | * | 5/1986 | Kasubuchi | F02N 15/06 475/345 |
| 5,323,663 A | * | 6/1994 | Ohgi | F02N 15/046 310/83 |
| 5,716,300 A | * | 2/1998 | Sammataro | B64C 27/12 464/63.1 |
| 8,517,880 B2 | * | 8/2013 | Hoshino | F04C 29/005 475/183 |
| 2003/0089897 A1 | * | 5/2003 | Hodge | B66D 1/22 254/344 |
| 2011/0068583 A1 | * | 3/2011 | Burkart | F03D 9/002 290/55 |
| 2013/0074635 A1 | * | 3/2013 | Thorson | F16D 3/50 74/490.01 |

FOREIGN PATENT DOCUMENTS

DE  199 63 597 A1  7/2001

* cited by examiner

*Primary Examiner* — Justin Holmes
(74) *Attorney, Agent, or Firm* — Maginot, Moore & Beck LLP

(57) ABSTRACT

A planetary gear mechanism, in particular for wind power plants, includes at least one planetary gear stage that has two power-split planetary stages connected in parallel. At least one of the two planetary stages includes a ring gear which is operatively connected to a housing. At least three planetary gear wheels are arranged on an inner circumferential face of the ring gear. The ring gear is flexible in the radial direction and is configured to be adjustable in order to compensate load between the at least three planetary gear wheels and the ring gear.

15 Claims, 4 Drawing Sheets

PLANETARY GEAR MECHANISM WITH ADJUSTABLE RING GEAR

This application claims priority under 35 U.S.C. §119 to patent application no. DE 10 2013 226 992.7, filed on Dec. 20, 2013 in Germany, and to patent application no. DE 10 2014 202 494.3, filed on Feb. 12, 2014, the disclosures of which are incorporated herein by reference in their entirety.

TECHNICAL FIELD

The disclosure relates to a planetary gear mechanism, in particular for wind power plants comprising at least one gear mechanism stage having two power-split planetary stages which are connected in parallel, wherein at least one of the two planetary stages comprises a ring gear which is operatively connected to a housing and on whose inner circumferential face at least three planetary gear wheels are arranged.

The field of application of the disclosure extends to all designs of wind power plant gear mechanisms. Inter alia, differential gear mechanisms, coupler gear mechanisms, hybrid gear mechanisms and also standard wind power transmissions are conceivable.

BACKGROUND

DE 199 63 597 A1 discloses a gear mechanism, in particular for wind power plants, composed of a drive-side planetary stage, downstream of which at least one gear mechanism stage is connected. The planetary gear mechanism if composed of at least two power-split planetary stages which are connected in parallel. A differential gear mechanism stage is connected downstream of the power-split planetary stages in order to sum the outflowing power of the two planetary stages.

From the generally known prior art, it is apparent that planetary stages in planetary gear mechanisms, in particular of wind power plants, are predominantly embodied with three or four planetary gear wheels. The sun gear is frequently arranged in a radially flexible fashion in the individual planetary stages, with the result that optimum load distribution between the planetary gear wheels is achieved. The planetary stages in wind power transmissions with four or more planetary gear wheels have until now been most widely embodied in a statically over-determined design, and the increase in the number of planetary gear wheels therefore entails high and uneconomic load increase factors.

Planetary gear mechanisms, in particular those with a differential stage, prove a potential for increasing the power density by increasing the number of planetary gear wheels from three to four or more planetary gear wheels. However, with the increase in number of planetary gear wheels, the influence of fabrication-related and assembly-related deviations of the machine elements on the increase in load in the tooth interventions increases. It is therefore necessary to design further load-balancing mechanisms.

SUMMARY

The object of the present disclosure is therefore to make available a planetary gear mechanism which permits optimum load distribution to all the planetary gear wheels.

According to the disclosure, the ring gear is embodied so as to be flexible in the radial direction and therefore adjustable in order to compensate load between the at least three planetary gear wheels and the ring gear. The first planetary stage is preferably operated in the two-shaft mode, wherein the ring gear is the fixed shaft. The torque of the ring gear is transmitted into the housing. The radial flexibility of the ring gear ensures load balancing of the planetary gear wheels. This permits, in particular, an increase in the number of planetary gear wheels, as a result of which the toothing systems and bearings can be given smaller dimensions and the power density in the planetary gear mechanism can be increased. The embodiment as a planetary gear mechanism in the three-shaft mode is also conceivable.

At least five planetary gear wheels are preferably arranged on the inner circumferential face of the ring gear. Increasing the number of planetary gear wheels from three to at least five planetary gear wheels divides the power flow among a plurality of individual power branches, with the result that the transmissible power can be increased or the planetary gear mechanism can be given smaller dimensions with the same power.

According to one preferred exemplary embodiment, the ring gear is operatively connected radially to the housing via a toothing system which is formed on the inner circumferential face and via an axial projection of the housing, which projection has a toothing system on an outer circumferential face. In other words, the ring gear is coupled via a type of gear coupling to the housing and permits radial widening of the ring gear, as a result of which load compensation of the planetary gear wheels is ensured. In this context, the ring gear can have a continuous running gear which permits rapid and simple fabrication. Furthermore, a non-uniform toothing system is also conceivable compared to the running gear as the gear coupling.

According to a further preferred exemplary embodiment, via axial projections and axial cutouts which are formed on an end face, the ring gear is operatively connected axially to the housing via axial cutouts and axial projections which are formed on the housing in a manner corresponding thereto. In other words, in the circumferential direction an axial projection is alternately followed by an axial cutout both in the ring gear and in the housing. The axial cutouts and the axial projections permit positive locking with one another in that in each case the projections of the ring gear come into abutment with the cutouts in the housing. Radial widening of the ring gear is therefore provided.

A spring element, comprising a toothing system on an inner circumferential face is preferably arranged between the ring gear and the housing in order to damp torsional vibrations between the ring gear and the housing, the toothing system of which spring element comes into abutment in the circumferential direction in each case between one of the axial projections of the ring gear and one of the axial projections of the housing. The spring element can be embodied as an elastomer ring and permits torsional-vibration-damping transmission of force between the ring gear and the housing, wherein the radial widening of the ring gear is retained. In addition, this exemplary embodiment also provides the advantage of balancing axial, radial and angular shaft alignment errors.

According to a further preferred exemplary embodiment, the ring gear has at least two axial bores and, via in each case a connecting element arranged therein, is connected axially to the housing towards the two end faces, wherein in at least two axial bores an elastomer sleeve for providing radial flexibility of the ring gear is arranged radially between the connecting element and the ring gear. The at least two bores in the ring gear are embodied as clearance fit bores. Bolts serve, in particular, as the connecting element between the ring gear and the housing. Other connecting elements such as, for example, screws are also conceivable. The transmission of the torque into the housing is ensured via the positive locking between the connecting element, the elastomer sleeve and the bore. The elasticity and therefore the change in cross section of the elastomer sleeve brought about by the frictional engagement gives rise to a radial adjustment movement of the ring gear.

According to a further preferred exemplary embodiment, the ring gear has at least two axial bores and, via in each case a connecting element arranged therein, is connected axially to the housing towards one end face, wherein a gap is formed radially between the connecting element and the ring gear, over essentially an entire bore length. The at least two axial bores are therefore embodied as clearance fit bores. The connecting element is permanently connected to one axial end of the ring gear, and is permanently connected by the other axial end to the housing. There is particularly preferably a press fit between the ring gear and the housing. Parallel displacement of the ring gear is ensured owing to the gap between the connecting element and the ring gear. The torque of the ring gear is transmitted into the housing via the connecting element by means of the positive fit between the at least two axial bores in the ring gear and said connecting element.

According to a further preferred exemplary embodiment, a driver ring is operatively connected radially to the ring gear via a toothing system formed on an inner circumferential face, with a toothing system formed on the outer circumferential face of the ring gear, wherein the toothing system is formed on the driver ring on a radially flexible and torsionally rigid section. For this purpose, the section is embodied in a particularly thin-walled fashion compared to the rest of the ring gear. The transmission of torque and therefore the connection of the ring gear to the housing are ensured via a gear coupling. Materials which are suitable for the driver ring are, in particular, tough and elastic metal substances. The thin-walled section favors elastic deformation and permits a radial load compensation movement of the planetary gear wheels.

According to a further preferred exemplary embodiment, the ring gear is operatively connected, via a toothing system formed on an outer circumferential face, to a toothing system formed on an inner circumferential face of the housing, wherein the toothing system is formed on the ring gear on a radially flexible and torsionally rigid section. In other words, the ring gear has a section which is relatively thin-walled compared to the rest of the ring gear, on which section the toothing system is arranged. The thin-walled section favors elastic deformation and permits load compensation of the planetary gear wheels.

According to a further preferred exemplary embodiment, the ring gear is operatively connected, via two toothing systems formed on an outer circumferential face, to two toothing systems formed on an inner circumferential face of the housing, wherein the two toothing systems are formed on the ring gear on a radially flexible and torsionally rigid section. The ring gear is therefore supported at two locations in the housing. The thin-walled sections favor elastic deformation and permit load compensation of the planetary gear wheels.

BRIEF DESCRIPTION OF THE DRAWINGS

Further measures which improve the disclosure are illustrated in more detail below by means of the figures, together with the description of preferred exemplary embodiments of the disclosure. In the drawings.

DETAILED DESCRIPTION

Figure 1:
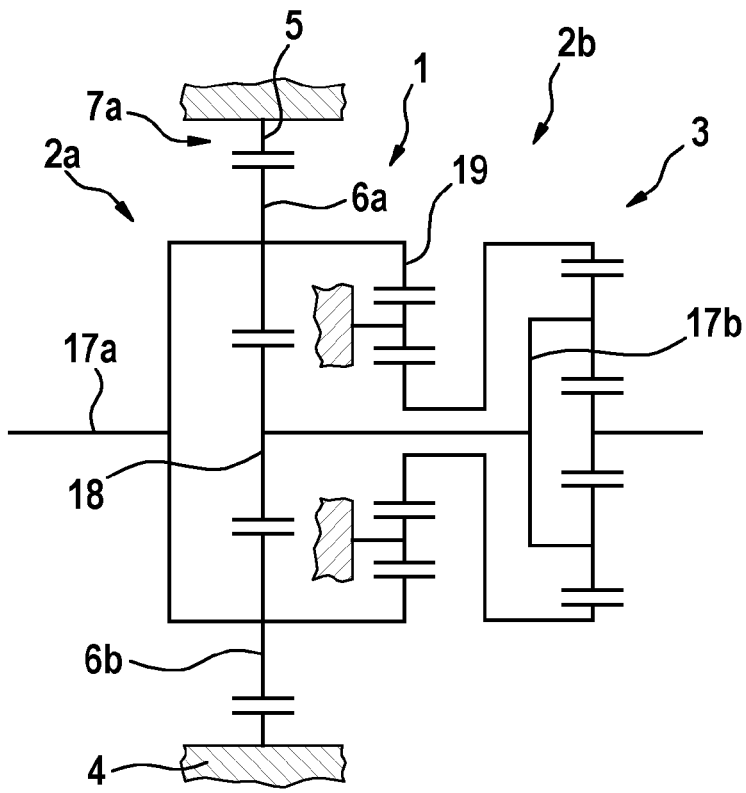
FIG. 1 shows a figurative illustration of a planetary gear mechanism according to the disclosure.

According to FIG. 1, the planetary gear mechanism comprises a gear mechanism stage 1 with two power-split planetary stages 2a, 2b which are connected in parallel. A differential stage 3 is connected downstream of the gear mechanism stage 1. A first part of the power flows via a planetary web 17a of the first planetary stage 2a to a ring gear shaft 19 of the second planetary stage 2b. Arranged on the planetary web 17a are five planetary gear wheels 6a, 6b—of which, however, only two planetary gear wheels 6a, 6b are shown owing to the illustration—which planetary gear wheels 6a, 6b are coupled to a toothing system 7a of a ring gear 5. The ring gear 5 is also coupled to a housing 4 via the toothing system 7a. In addition, the ring gear 5 is embodied so as to be flexible in the radial direction and therefore adjustable in order to compensate load between the five planetary gear wheels 6a, 6b and the ring gear 5. A second part of the power flows to the planetary web 17b to the power-summing differential stage 3 via the ring gear 5 and the sun gear wheel shaft 18.

Figure 2:
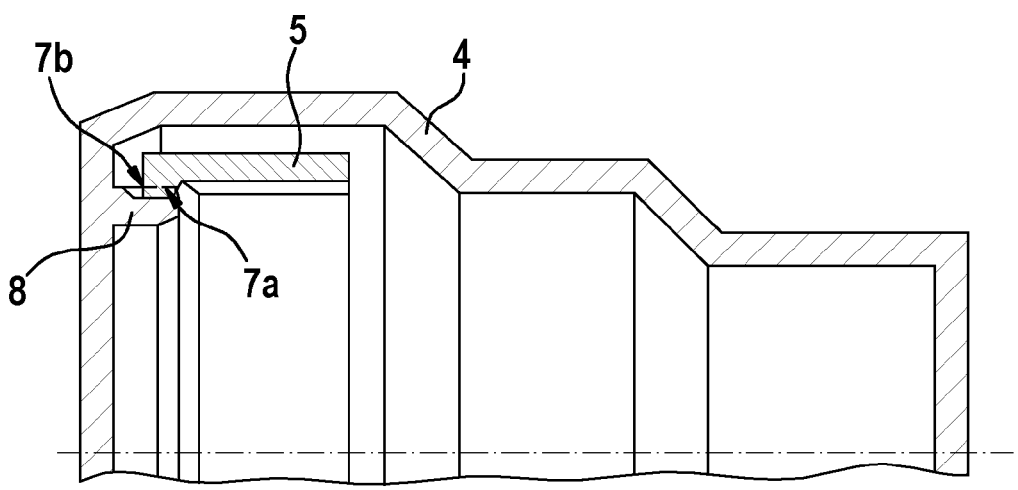
FIG. 2 shows a partial sectional view of the coupling according to the disclosure between the ring gear and housing from FIG. 1.

According to FIG. 2, via a toothing system 7a formed on the inner circumferential face, the ring gear 5 is operatively connected radially to the housing 4 via an axial projection 8 of the housing 4, which projection 8 has a toothing system 7b on an outer circumferential face. Radially between an outer circumferential face of the ring gear 5 and the housing 4, there is sufficient space for widening the ring gear 5 owing to the relatively thin-walled construction of the ring gear 5 and the elasticity of the material. Consequently, the ring gear 5 is embodied so as to be flexible in the radial direction and therefore adjustable.

Figure 3A:
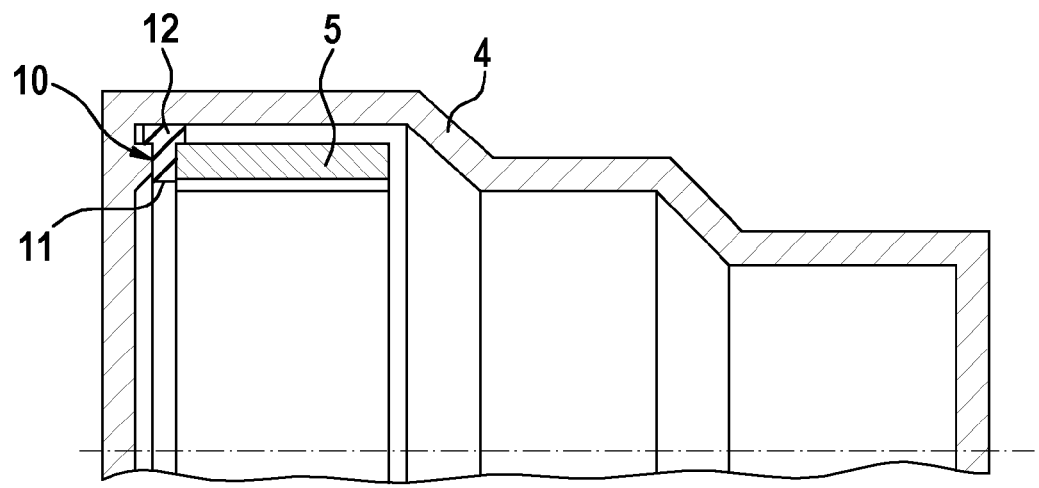
FIG. 3a shows a partial sectional view of the coupling according to the disclosure between the ring gear and housing according to a second exemplary embodiment.
Figure 3B:
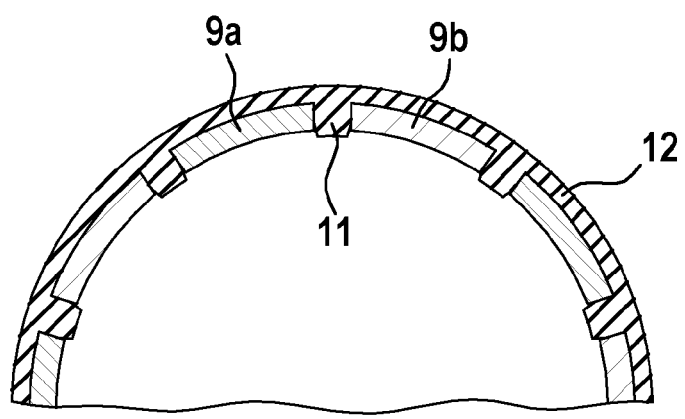
FIG. 3b shows a partial sectional view of the connection between the axial projections in the housing, the axial projections in the ring gear and a spring element.

According to FIGS. 3a and 3b, the ring gear 5 is operatively connected to the housing 4 via a spring element 12 in the form of an elastomer ring 12, arranged axially between the ring gear 5 and the housing 4. For this purpose, the ring gear 5 has axial projections 9a and axial cutouts 10 on an end face directed towards the housing 4. The housing 4 also has, on an end face directed to the ring gear 5, axial projection 9b and axial cutouts 10 which are embodied so as to correspond to the axial projections 9a and the axial cutouts 10 of the ring gear 5. The axial recesses 9a of the ring gear 5 are arranged in an axial cutout 10 between two axial recesses 9b of the housing 4. In addition, the spring element 12 has, on an inner circumferential face, a toothing system 11 for torsional-vibration damping between the ring gear 5 and the housing 4. The toothing system 11 of the elastomer ring 12 comes into abutment in the circumferential direction in each case between one of the axial projections 9a of the ring gear 5 and one of the axial projections 9b of the housing 4. In addition, the elastomer ring 12 bears with an outer circumferential face against the housing 4. Radially between the outer circumferential face of the ring gear 5 and the housing 4, there is sufficient space for widening the ring gear 5 owing to the relatively thin-walled construction of the ring gear 5 and the elasticity of the material. Consequently, the ring gear 5 is embodied so as to be flexible in the radial direction and therefore adjustable.

Figure 4:
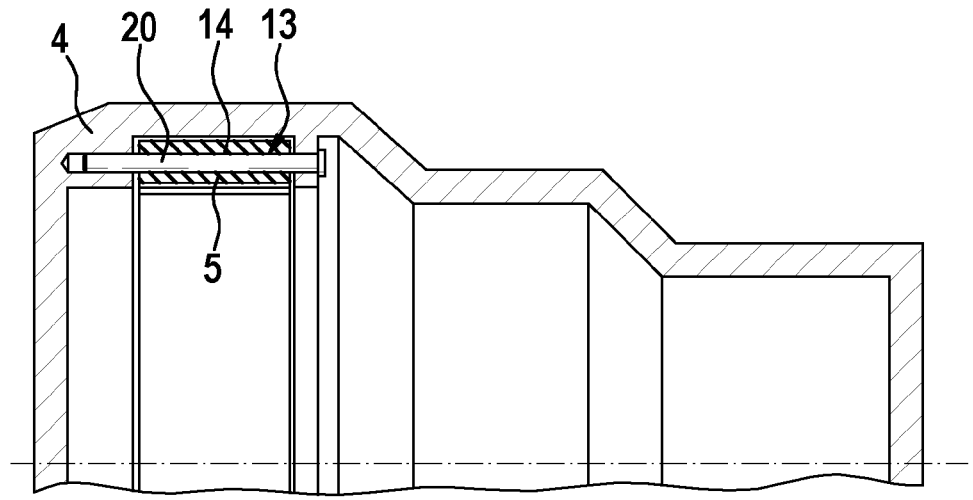
FIG. 4 shows a partial sectional view of the coupling according to the disclosure between the ring gear and housing according to a third exemplary embodiment.

In FIG. 4, the ring gear 5 has two axial bores 13—only one axial bore 13 of which can be seen owing to the illustration—through which a bolt 20 extends. The bolt 20 which serves as a connecting element axially connects the ring gear 5 towards both end faces to the housing 4, wherein an elastomer sleeve 14 for providing radial flexibility of the ring gear 5 is arranged radially between the bolt 20 and the ring gear 5. Radially between the outer circumferential face of the ring gear 5 and the housing 4, there is sufficient space for widening the ring gear 5 owing to the connection between the ring gear 5 and the elastomer sleeve 14. Consequently, the ring gear 5 is embodied so as to be flexible in the radial direction and therefore adjustable.

Figure 5:
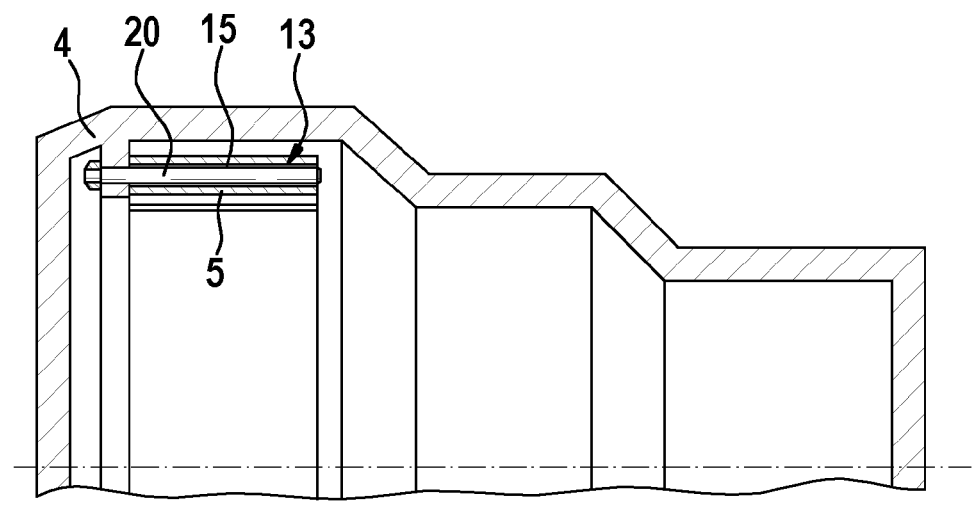
FIG. 5 shows a partial sectional view of the coupling according to the disclosure between the ring gear and housing according to a fourth exemplary embodiment.

According to FIG. 5, the ring gear 5 has two axial bores 13—just one axial bore 13 of which can be seen owing to the illustration—through which a bolt 20 extends. The bolt 20 which serves as a connecting element axially connects the ring gear 5 towards an end face to the housing 4, wherein a gap 15 is formed over essentially an entire bore length, radially between the bolt 20 and the ring gear 5. The configuration of the gap 15 depends on the shaping of the bolt 20. The length of the gap 15 depends in turn on the configuration of the interference fit between the bolt 20 and the bore 13 in the ring gear 5. The flexural contour of the bolt 20 therefore permits parallel displacement of the ring gear 5 by means of constriction regions on the bolt cross section. The bolt 20 comes to bear against the end face opposite the end face which is connected to the housing 4, and said bolt 20 is permanently connected to the housing 4. In the load-free state only the bearing face between the bolt 20 and the housing 4 and interference fit between the bolt 20 and the ring gear 5 are involved in the frictionally locking bond. When frictional engagement occurs, the bolts 20 and the bore 13 form a positive fit, with the result that the torque is transmitted into the housing 4 via the bolt 20 via the curvatures of the bolt 20 and the bore 13 which virtually correspond to one another. Radially between the outer circumferential face of the ring gear 5 and the housing 4, there is sufficient space to widen the ring gear 5. The gap 15 between the bolt 20 and the ring gear 5 permits radial displacement of the ring gear 5. Consequently, the ring gear 5 is embodied so as to be flexible in the radial direction and therefore adjustable.

Figure 6:
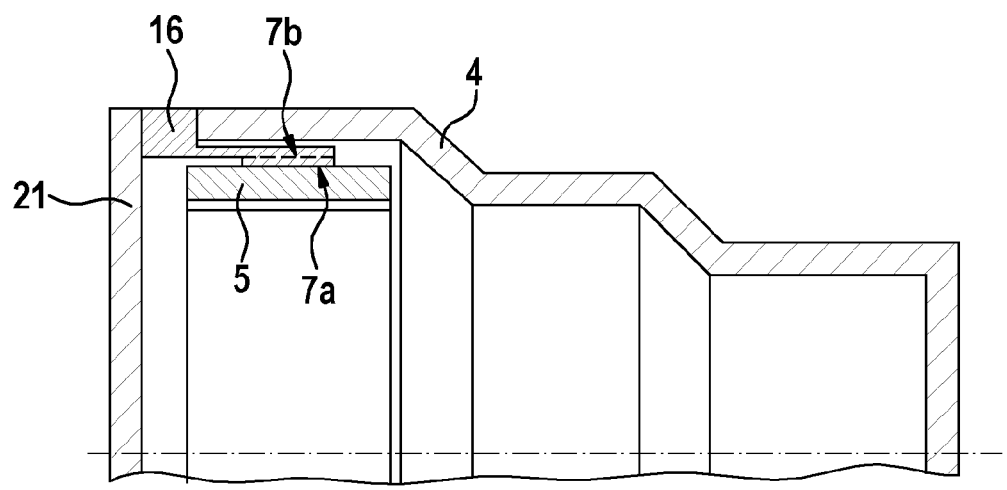
FIG. 6 shows a partial sectional view of the coupling according to the disclosure between the ring gear and housing according to a fifth exemplary embodiment.

According to FIG. 6, a driver ring 16 is operatively connected radially to the ring gear 5 via a toothing system 7a formed on an inner circumferential face, with a toothing system 7b formed on the outer circumferential face of the ring gear 5. The toothing system 7a on the driver ring 16 is formed on a radially flexible and torsionally rigid section. The radial flexibility of the section of the driver ring 16 originates from a relatively thin-walled construction and the elasticity of the material. The driver ring 16 can be attached axially to the housing 4 in the axial direction between the housing 4 and a housing lid 21 via screws, bolts or other connecting elements (not illustrated here). Radially between the driver ring 16 and housing 4, there is sufficient space for the radial displacement of the ring gear 5. Consequently, the ring gear 5 is embodied so as to be flexible in the radial direction and therefore adjustable.

Figure 7A:
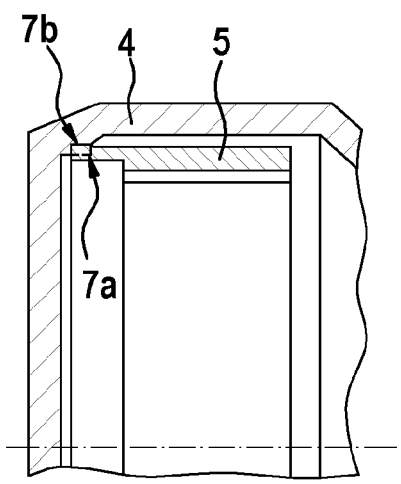
FIG. 7a shows a partial sectional view of the coupling according to the disclosure between the ring gear and housing according to a sixth exemplary embodiment.

According to FIG. 7a, the ring gear 5 is operatively connected, via a toothing system 7b formed on an outer circumferential face, to a toothing system 7a formed on an inner circumferential face of the housing 4. The toothing system 7b on the ring gear 5 is formed on a radially flexible and torsionally rigid section. The radial flexibility of the section originates from a relatively thin-walled construction and the elasticity of the material. The shaping of the contour is decisive, the said shaping permitting a radial compensation movement of the ring gear in the surroundings of the system by virtue of selective weakenings of the flexural strength.

Figure 7B:
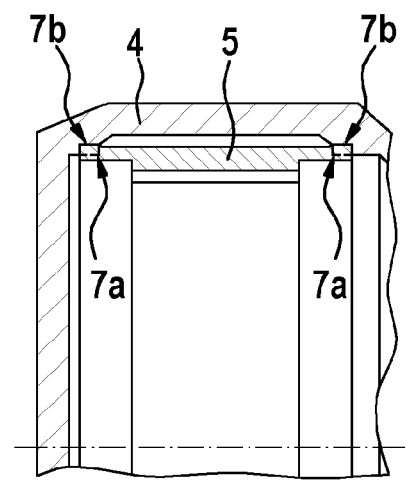
FIG. 7b shows a partial sectional view of the coupling according to the disclosure between the ring gear and housing according to a seventh exemplary embodiment.

According to FIG. 7b, via two toothing systems 7b formed on an outer circumferential face, the ring gear 5 is operative connected to two toothing systems 7a formed on an inner circumferential face of the housing 4. The two toothing systems 7b on the ring gear 5 are formed on a radially flexible and torsionally rigid section. The radial flexibility of the section originates from a relatively thin-walled construction and the elasticity of the material.

Both in the exemplary embodiment in FIG. 7a and in the exemplary embodiment in FIG. 7b there is, in the radial direction between the ring gear 5 and the housing 4, sufficient space for the radial displacement of the ring gear 5. The ring gear 5 is consequently embodied so as to be flexible in the radial direction and therefore adjustable.

The disclosure is not restricted to the preferred exemplary embodiment according to FIG. 1 which is described above. Instead, refinements thereof which are included in the scope of protection of the following claims are also conceivable. The exemplary embodiment shown in FIG. 1 serves only for the sake of illustration using the example of a differential gear mechanism. The disclosure relates to a wind power transmission of any design.

LIST OF REFERENCE NUMBERS

1 Gear mechanism stage
2a, 2b Planetary stage
3 Differential stage
4 Housing
5 Ring gear
6 Planetary gear wheel
7a, 7b Toothing system
8 Projection
9a, 9b Projections
10 Cutouts
11 Toothing system
12 Spring element
13 Bores
14 Elastomer sleeve
15 Gap
16 Driver ring
17a, 17b Planetary web
18 Sun gear wheel shaft 19 Ring gear shaft
20 Bolt
21 Housing lid

What is claimed is:

1. A planetary gear mechanism, comprising:
a housing including at least one axial projection having an outer circumferential face that includes a second toothing system; and
a planetary stage that includes:
a ring gear including an inner circumferential face having a first toothing system formed thereon, the ring gear being operatively connected to the housing in a radial direction via engagement between the first and second toothing systems; and
at least three planetary gear wheels positioned on an inner circumferential face of the ring gear;
wherein the ring gear is flexible in a radial direction so as to be adjustable, and is configured to compensate load between the at least three planetary gear wheels and the ring gear.

2. The planetary gear mechanism according to claim 1, wherein at least five planetary gear wheels are positioned on the inner circumferential face of the ring gear.

3. The planetary gear mechanism according to claim 1, wherein:
the at least one projection of the housing includes a plurality of first axial projections defining first axial cutouts therebetween so as to form the second toothing system, the first axial projections being formed on an end face of the housing;
the first toothing system includes second axial projections and second axial cutouts formed on the ring gear, the second axial projections and the second axial cutouts correspond to the first axial cutouts and first axial projections, respectively; and
the ring gear is operatively connected to the housing via engagement between the corresponding axial projections and axial cutouts.

4. The planetary gear mechanism according to claim 3, further comprising:
a spring element that includes an inner circumferential face having a third toothing system, the spring element being positioned axially between the ring gear and the housing, and being configured to damp torsional vibrations between the ring gear and the housing, wherein the third toothing system is configured to come into abutment with each of the second axial projections and one of the first axial projections in a circumferential direction.

5. The planetary gear mechanism according to claim 1, wherein the ring gear further includes at least two axial bores, each axial bore respectively having:
a connecting element that is positioned therein, and that is configured to operatively connect the ring gear to the housing towards two end faces of the housing; and
an elastomer sleeve that is positioned radially between the connecting element and the respective axial bore, and that is configured to provide radial flexibility in the ring gear.

6. The planetary gear mechanism according to claim 1, wherein:
the ring gear further includes at least two axial bores, each axial bore respectively having a connecting element positioned therein that is configured to operatively connect the ring gear to the housing towards one end face of the housing; and
each connecting element is configured and arranged within a corresponding axial bore so as to define a respective radial gap between each connecting element and the ring gear over a substantial entirety of a length of the corresponding axial bore.

7. The planetary gear mechanism according to claim 1, wherein the axial projection is integrally formed with the housing.

8. The planetary gear mechanism according to claim 1, wherein the first toothing system is formed as a continuous running gear.

9. The planetary gear mechanism according to claim 1, wherein the first toothing system is formed as a non-uniform toothing system.

10. A planetary gear mechanism, comprising:
a housing including at least one axial projection having an outer circumferential face that includes a second toothing system;
a gear mechanism stage that includes two power-split planetary stages connected in parallel, at least one of the two power-split planetary stages including:
a ring gear including an inner circumferential face having a first toothing system formed thereon, the ring gear being operatively connected to the housing in a radial direction via engagement between the first and second toothing systems; and
at least three planetary gear wheels positioned on an inner circumferential face of the ring gear;
wherein the ring gear is flexible in a radial direction so as to be adjustable, and is configured to compensate load between the at least three planetary gear wheels and the ring gear.

11. The planetary gear mechanism according to claim 10, wherein at least five planetary gear wheels are positioned on the inner circumferential face of the ring gear.

12. The planetary gear mechanism according to claim 10, wherein:
the at least one projection of the housing includes a plurality of first axial projections defining first axial cutouts therebetween so as to form the second toothing system, the first axial projections being formed on an end face of the housing;
the first toothing system includes second axial projections and second axial cutouts formed on the ring gear, the second axial projections and the second axial cutouts correspond to the first axial cutouts and first axial projections, respectively; and
the ring gear is operatively connected to the housing via engagement between the corresponding axial projections and axial cutouts.

13. The planetary gear mechanism according to claim 10, wherein the axial projection is integrally formed with the housing.

14. The planetary gear mechanism according to claim 10, wherein the first toothing system is formed as a continuous running gear.

15. The planetary gear mechanism according to claim 10, wherein the first toothing system is formed as a non-uniform toothing system.

* * * * *